Aug. 10, 1965      O. DYE      3,199,278
LAWN CARE MACHINE
Filed June 24, 1963
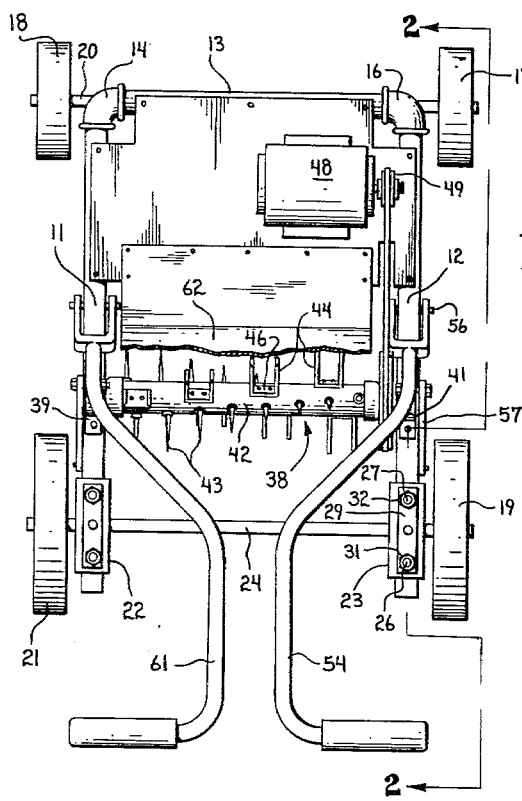
Fig. 1.
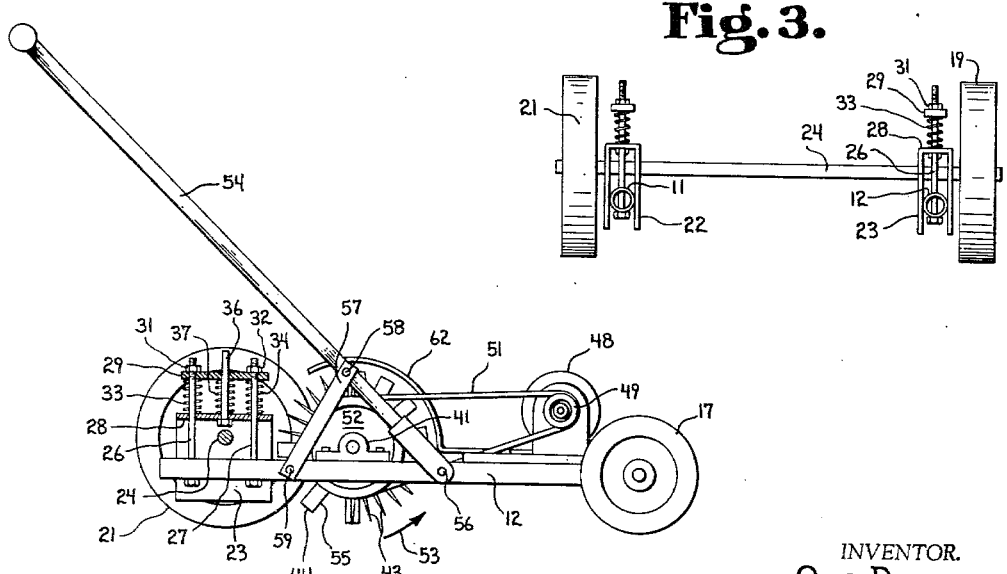
Fig. 3.
Fig. 2.
INVENTOR.
OVID DYE
BY
*Lockwood, Woodard, Smith & Weikart*
Attorneys 3,199,278
LAWN CARE MACHINE
Ovid Dye, 1722 Pasadena St., Indianapolis 19, Ind.
Filed June 24, 1963, Ser. No. 290,100
10 Claims. (Cl. 56—27)

This invention relates generally to lawn care machines and more particularly to a machine well suited to removal of thatch, creeping vines and weeds from a lawn, garden, or field.

For a number of years, it has been common practice for many people to leave grass clippings lie on a lawn after cutting the lawn. However, it is recognized that in many instances, the amount and nature of the clippings is such that over a period of time they form a mat or thatch. This tends to smother the grass and makes it quite difficult, if not impossible, to reseed a lawn. Various devices have been conceived for removal of thatch from a lawn and have met with varying success. The present invention represents an improvement over the presently known machines.

It is a general object of the present invention to provide improved means for removal of thatch, creeping vines, and weeds, and the like from lawns.

A further object is to provide a device which can be readily and inexpensively constructed.

A further object is to provide a device accommodating operator control as needed by existing conditions in a lawn.

A further object is to provide a device of rugged and dependable character.

A still further object is to provide a device adapted to powered operation by readily available conventional power sources.

Described briefly, a typical embodiment of the present invention includes a generally horizontal frame supported at its forward end by a pair of wheels and supported at its rear end by an additional pair of wheels. Springs are provided for resilient support at the rear end. The left and right-hand rear ends of the frame are independently suspended and a rotor is rotatably mounted to the frame. Each end of the rotor is mounted to one side member of the frame and by reason of the independent suspension, the rotational axis of the rotor can be inclined with respect to the supporting surface for the wheels. A handle is provided for each of the side members allowing the operator to control the attitude of the rotor.

The full nature of the invention will be understood from the accompanying drawings and the following description and claims.

FIG. 1 is a top plan view of a typical embodiment of the present invention.

FIG. 2 is an elevational view taken along the line 2—2 in FIG. 1, a portion being shown in section.

FIG. 3 is a rear elevational view of the typical embodiment showing the rear suspension components but omitting the rest of the machine to facilitate illustration.

Referring to the drawings in detail, the illustrated embodiment of the invention includes a generally horizontal U-shaped frame having a pair of elongated side members or legs 11 and 12 in horizontally spaced relation. A cross member 13 is provided at the front of the side members forming the intermediate leg of the U. While the side members are normally coplanar, they are attached to the front cross member 13 so as to be movable out of coplanar relationship and pivotable about a longitudinal axis through the center of the cross member 13. In the illustrated embodiment, round sections of pipe are employed to provide the side members 11 and 12 as well as the front cross member 13. They are connected by the elbows 14 and 16, the elbows being threadedly received by and rotatable on the cross member 13. The threaded connections are loose enough to permit the side members 11 and 12 to move out of the normally coplanar relationship.

Support for the front portion of the frame is provided by the wheels 17 and 18 mounted to the axle 20 which extends through the front cross member 13, passing through apertures in the elbows 14 and 16. Support for the rear ends of the frame is provided by the wheels 19 and 21 through a novel mounting arrangement which will now be described.

Two yokes 22 and 23 are secured to a rear cross member 24. Each of the yokes has an axle secured thereto and supported by one of the wheels 19 or 21. The cross member 24 can function as an axle for both of the wheels 19 and 21 if desired. These yokes are downwardly opening and receive the rear end portions of the frame side members 11 and 12 respectively. As shown in FIG. 2, a pair of bolts 26 and 27 pass through apertures in the horizontal intermediate portion 28 of the yoke 23. These bolts also pass through a suspension bar 29 and pass through the rear end portion of the side member 12 and serve as hangers therefor. Nuts 31 and 32 are provided on the upper ends of the bolts 26 and 27 respectively. Coil springs 33 and 34 are disposed around the bolts 26 and 27, respectively, and between the suspension bar 29 and the intermediate portion 28 of the yoke 23. An upstanding stud 36 is secured to the intermediate portion 28 of the yoke 23 and passes through an aperture in the suspension bar 29. A third coil spring 37 is disposed around the stud 36 and between the suspension bar 29 and the intermediate portion 28 of the yoke. The three coil springs provide resilient suspension for the rear portion of the side member 12. This is because the wheel 19 is mounted to the axle supporting the yoke 23.

Identical construction is provided at the opposite end of the cross member 24 whereby the wheel 21 resiliently suspends the rear portion of the side member 11. By reason of the provision for relative rotation between the side members 11 and 12 and the cross member 13, and by reason of the independent suspension of the rear ends of the side members, these two members are free to move out of a coplanar relationship, although they are normally maintained in a coplanar relationship by the springs suspending them.

A rotor 38 is mounted to the frame by self-centering bearings 39 and 41 at each end of the rotor and mounted to the side members 11 and 12 respectively. The rotor includes a round tubular portion 42 having a plurality of pointed spikes 43 extending radially outwardly therefrom. These spikes are arranged in spiral rows, there being two spiral rows in the illustrated embodiment.

Between each row of spikes, there is a spiral row of knives 44. These knives are conveniently provided in generally U-shaped units having a central portion 46 bolted to the rotor tube 42 and having a pair of knives extending outwardly in horizontally spaced relation.

A motor 48 is mounted to the frame and has a drive pulley 49 driving the belt 51 which drives the pulley 52 connected to the rotor. It is customary to drive the rotor at a speed of approximately 600 r.p.m., though other speeds may be found desirable in certain instances. The direction of rotation of the rotor is in the counter clockwise direction when viewed from the righthand side, as shown in FIG. 2. In other words, the direction of the rotor is in the direction of the arrow 53.

Because of the provision of the spikes 43 in spiral rows, no two of them simultaneously passes a vertical plane containing the axis of rotation of the rotor. This minimizes the chance of overloading the rotor and tends to provide for smooth and yet effective operation. It also precludes the digging up of chunks of earth even if the spikes do touch and penetrate the soil somewhat. The knives not only effectively cut creeping vines and weeds, but also minimize the chance of wrapping thereof around the rotor. It is the forward edges 55 of the knives that are sharpened and they are sharpened from a point near the rotor tube to their outer tips.

A handle 54 is attached to the frame side member 12 at the point 56. A brace 57 is attached at 58 to the handle and at 59 to the frame side member 12. In like manner, a handle 61 is attached to the side member 11. These handles can be moved independently of each other and are, therefore, useful to change the relative vertical positions between the side members and the wheels 19 and 21. As was previously indicated, this is possible by reason of the nature of mounting of the front and rear ends of the side members. Therefore, the rotational axis of the rotor 38 can be inclined as desired by merely manipulating the handles 54 and 61. This is true even on level ground. Thus the elevation of the various portions of the rotor can be changed by merely manipulating the handles 54 and 61. Various conditions of weeds and thatch in the surface or in the lawn can make this feature quite beneficial.

A shield 62 is normally mounted in front of the rotor to prevent throwing of weeds and thatch onto the motor.

The normal operating elevation of the rotor can be adjusted as desired by suitably positioning the nuts 31 and 32 on the suspension bolts at the two yokes.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A lawn care machine comprising: a set of support wheels; a frame supported by said support wheels and including a cross member supported directly by a pair of said support wheels, said frame having elongated side members extending rearwardly from said cross member; an axle supported by two additional ones of said support wheels and having a pair of yokes secured thereto, said yokes having depending side members perpendicular to the axis of said axle, one yoke being disposed adjacent each of said additional wheels; a pair of hangers, each hanger of said pair extending through one of said yokes and attached to one of said frame side members adjacent the rear end thereof, said hangers being supported by springs to resiliently suspend the rear portions of said frame side members; a motor mounted to said frame; a rotor pivotally mounted to said frame and having means thereon coupled to said motor for driving said rotor thereby; a plurality of U-shaped cutter members mounted to said rotor; and a plurality of prongs mounted to said rotor.

2. The lawn care machine as set forth in claim 1 wherein said U-shaped cutter members are mounted to said rotor in a spiral fashion and said prongs are mounted to said rotor in a spiral fashion.

3. The lawn care machine as set forth in claim 1 and further comprising: upstanding handle means connected to said frame and including brace means connected to said side members for facilitating the selective inclination of said rotor.

4. A lawn care machine comprising: a first pair of support wheels; a generally U-shaped frame having side legs and an intermediate leg and lying in a substantially horizontal plane, the intermediate leg of said frame being supported by said first pair of support wheels; a second pair of support wheels with an axle extending therebetween; a pair of yokes mounted to the axle extending between said second pair of support wheels, with each yoke overlying a portion of one of the said side legs of said U-shaped frame; means resiliently mounted to said yokes and connected to said side legs of said frame to resiliently support the side leg portions of said frame at points in horizontally spaced relation to the first pair of said wheels; a rotor mounted for rotation on said frame, said rotor including a plurality of projections mounted thereto and extending outwardly therefrom; and motor means mounted to said frame and driving said rotor to rotate said rotor for moving said projections in circular paths lying in planes generally perpendicular to said axles.

5. The machine as set forth in claim 4 wherein said projections include a plurality of U-shaped knives with the central portion of the U being secured directly to said rotor and the leg portions extending radially outward therefrom, said knives being mounted to said rotor in a generally spiral path around the periphery of said rotor.

6. The machine as set forth in claim 5 wherein said projections further include: a plurality of pointed spikes mounted to said rotor and extending radially outwardly therefrom, the mounting points to said rotor being in a generally spiral path around said rotor.

7. A lawn care machine comprising: a frame having side members in spaced relation and a cross member mounted thereto; first wheel means supporting said cross member and supporting said side members; second and third wheel means; means coupling said second wheel means to a first of said side members and further supporting said first side member and accommodating vertical relative movement between said first side member and said second wheel means, and means coupling said third wheel means to a second of said side members and further supporting said second side member and accommodating vertical relative movement between said second side member and said third wheel means; and a rotor extending across said frame and pivotally mounted to said side members, the elevation of portions of said rotor above a wheel means supporting surface being dependent upon the vertical positions of said side members with respect to said second and third wheel means.

8. The machine of claim 7 further comprising: handle means connected to said side members and movable to vary relative vertical positions of said side members with respect to said second and third wheel means independently to incline said rotor when desired.

9. The machine of claim 7 wherein said coupling means includes resilient means providing the further support for said side members.

10. The machine of claim 8 wherein said handle means includes a first handle secured to said first side member and a second handle separate from said first handle and secured to said second side member.

References Cited by the Examiner

UNITED STATES PATENTS

| | | | |
|---|---|---|---|
| 1,311,382 | 7/19 | Cureton | 56—229 |
| 2,111,478 | 3/38 | McGuire | 172—21 |
| 2,483,846 | 10/49 | Roche et al. | 56—249 |
| 2,683,344 | 7/54 | Evans | 56—27 |
| 2,730,857 | 1/56 | Meyers | 56—249 |
| 2,923,117 | 2/60 | Henderson | 56—294 |

T. GRAHAM CRAVER, *Primary Examiner.*

RUSSELL R. KINSEY, *Examiner.*